United States Patent
Pyo et al.

(10) Patent No.: US 9,317,152 B2
(45) Date of Patent: Apr. 19, 2016

(54) DISPLAY DEVICE INCLUDING INTEGRATED TOUCH PANEL AND METHOD OF DRIVING THE SAME

(71) Applicant: LG Display Co., Ltd., Seoul (KR)

(72) Inventors: Seung-Eun Pyo, Incheon (KR); Jeong-Seop Lee, Gimje-si (KR)

(73) Assignee: LG Display Co., Ltd., Seoul (KR)

( * ) Notice: Subject to any disclaimer, the term of this patent is extended or adjusted under 35 U.S.C. 154(b) by 230 days.

(21) Appl. No.: 13/855,211

(22) Filed: Apr. 2, 2013

(65) Prior Publication Data

US 2014/0132525 A1    May 15, 2014

(30) Foreign Application Priority Data

Nov. 13, 2012    (KR) ...................... 10-2012-0127994

(51) Int. Cl.
*G06F 3/044* (2006.01)
*G06F 3/041* (2006.01)

(52) U.S. Cl.
CPC ............ *G06F 3/0412* (2013.01); *G06F 3/0418* (2013.01); *G06F 3/044* (2013.01)

(58) Field of Classification Search
USPC .................................................. 345/173–174
See application file for complete search history.

(56) References Cited

U.S. PATENT DOCUMENTS

| | | | |
|---|---|---|---|
| 2008/0062140 A1* | 3/2008 | Hotelling et al. | 345/173 |
| 2008/0157882 A1* | 7/2008 | Krah | G06F 3/0416 331/18 |
| 2008/0157893 A1 | 7/2008 | Krah | |
| 2008/0158180 A1 | 7/2008 | Krah et al. | |
| 2010/0051354 A1* | 3/2010 | Ningrat | G06F 3/044 178/18.06 |
| 2011/0063993 A1* | 3/2011 | Wilson | G06F 3/044 370/254 |
| 2012/0162134 A1* | 6/2012 | Chen | G09G 3/3648 345/174 |
| 2013/0257518 A1* | 10/2013 | Hou | H03K 17/962 327/517 |

FOREIGN PATENT DOCUMENTS

| | | |
|---|---|---|
| CN | 102662518 A | 9/2012 |
| KR | 10-2012-0017887 A | 2/2012 |
| TW | 201128473 A | 8/2011 |

OTHER PUBLICATIONS

Korean Intellectual Property Office, Office Action, Korean Patent Application No. 10-2012-0127994, Mar. 31, 2014, five pages [with concise explanation of relevance in English].
Chinese First Office Action, Chinese Application No. 201310158469.3, Mar. 3, 2016, 22 pages.

* cited by examiner

*Primary Examiner* — Quan-Zhen Wang
*Assistant Examiner* — Chad Dicke
(74) *Attorney, Agent, or Firm* — Fenwick & West LLP

(57) ABSTRACT

A method of driving a display device including an integrated touch panel, the method comprising: applying a plurality of sampling voltages to a plurality of electrodes of the integrated touch panel; determining a plurality of noise levels each of which is associated with a corresponding one of the plurality of sampling voltages; comparing the plurality of noise levels to a threshold level; and selecting a sampling voltage from the plurality of sampling voltages to use as a touch driving voltage based on the comparison of the plurality of noise levels to the threshold level; and applying the selected sampling voltage as the touch driving voltage to the plurality of electrodes.

18 Claims, 5 Drawing Sheets

FIG. 2B
(Related Art)
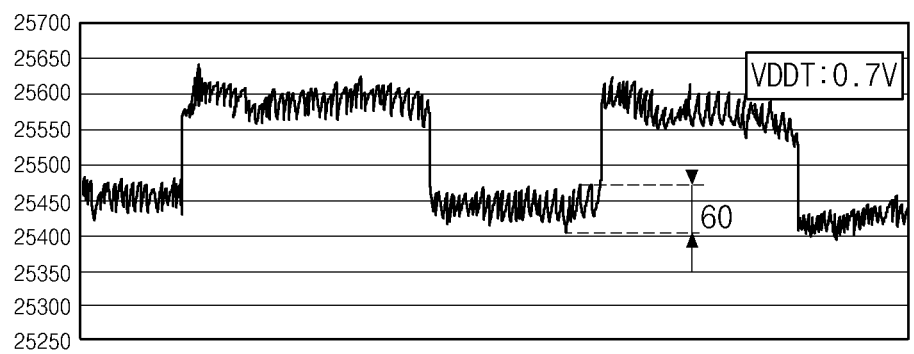
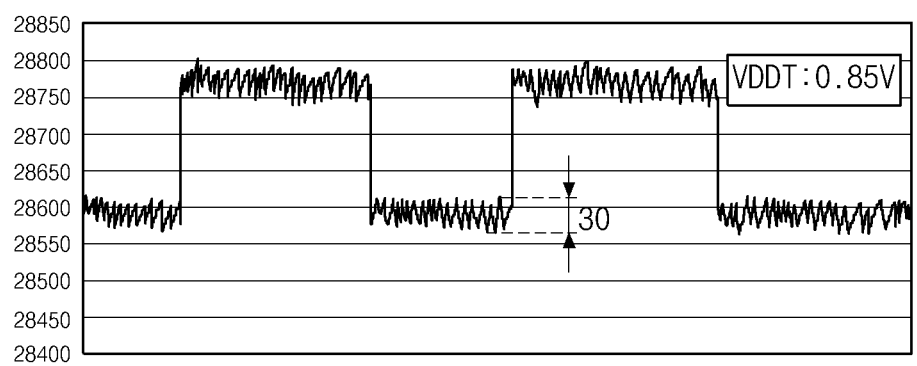

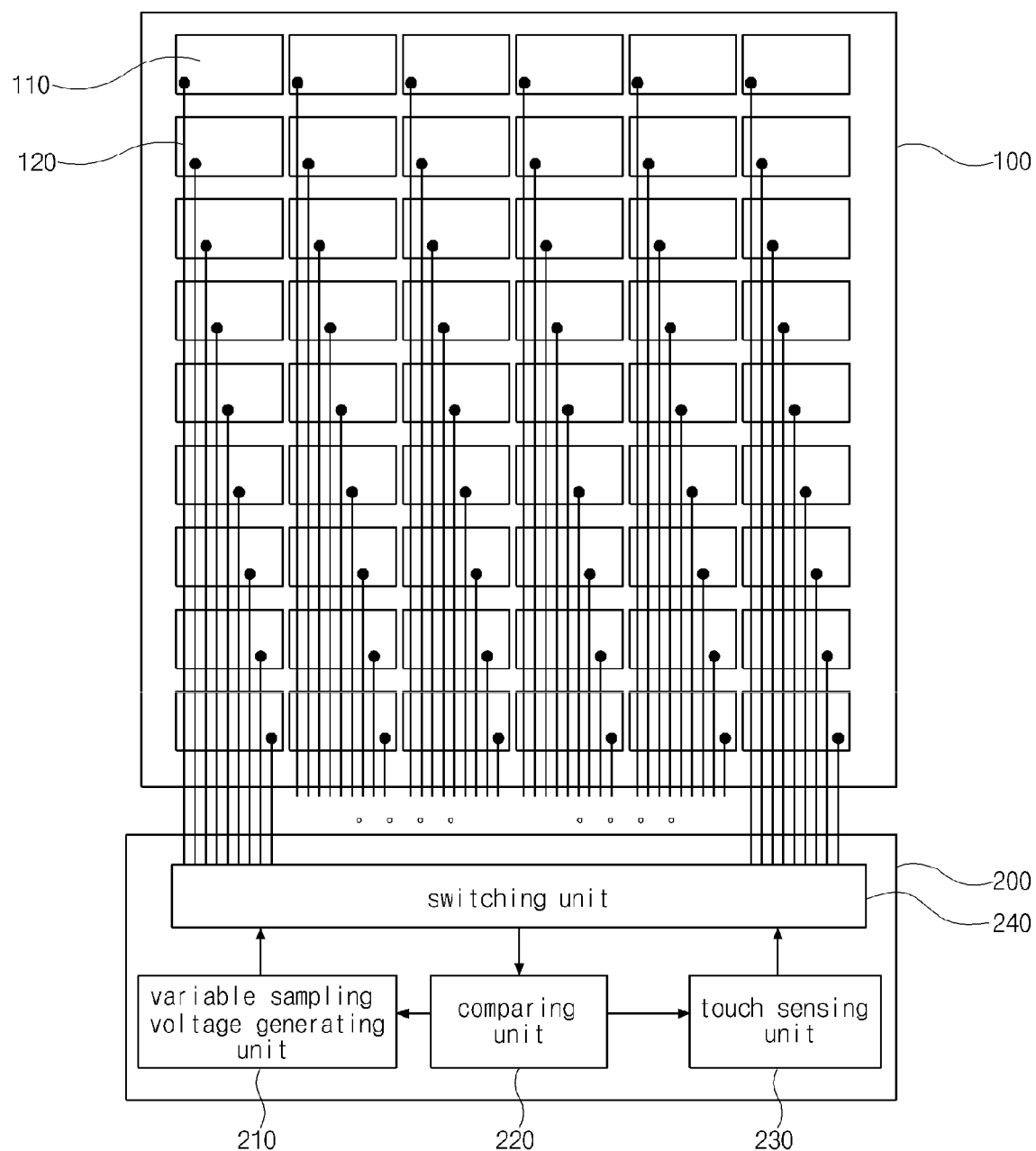

DISPLAY DEVICE INCLUDING INTEGRATED TOUCH PANEL AND METHOD OF DRIVING THE SAME

CROSS-REFERENCE TO RELATED APPLICATION(S)

This application claims the benefit under 35 U.S.C. §119(a) of Korean Patent Application No. 10-2012-0127994, filed on Nov. 13, 2012, in the Korean Intellectual Property Office, the entire disclosure of which is incorporated by reference herein for all purposes.

BACKGROUND

1. Technical Field

The following description relates to a display device, and more particularly, to a display device including an integrated touch panel.

2. Discussion of the Related Art

A touch panel is a kind of input device that is installed in an image display device, such as a liquid crystal display (LCD), a field emission display (FED), a plasma display panel (PDP), an electroluminescence device (EL), an electrophoretic display (EPD), etc., to allow a user to input predetermined information by pressing (or touching) a touch sensor in the touch screen while viewing the image display device.

Recently, in order to implement a slim mobile terminal, such as a smart phone, a tablet PC, or the like, demands on an in-cell type display device including an integrated touch panel where elements configuring the touch panel are installed are increasing.

Hereinafter, an in-cell type display device including an integrated touch panel and a noise level according to application of a touch driving voltage will be described with reference to FIGS. 1, 2A, and 2B.

FIG. 1 is a view showing a display device including an integrated touch panel according to the related art. Specifically, FIG. 1 shows an in-cell self-capacitive type display device including an integrated touch panel.

In FIG. 1, an in-cell self-capacitive type display device including an integrated touch panel according to the related art includes a panel 10 where a plurality of electrodes 11 and a plurality of lines 12 connected to the plurality of electrodes 11, respectively, are formed, and a touch integrated circuit (IC) 20.

For example, the touch IC 20 may sense a change in capacitance due to a touch input applied to the plurality of electrodes 11 through a touch sensing unit 21.

FIGS. 2A and 2B are graphs showing a noise level according to application of a touch driving voltage in a display device including an integrated touch panel according to the related art.

In FIG. 2A, when touch driving voltages VDDT of about 0.7V and about 0.85V are applied to a plurality of electrodes of a first display device including an integrated touch panel, touch sensing results of changes in capacitance have noise levels of about 25 F and about 30 F, respectively.

In FIG. 2B, when touch driving voltages VDDT of about 0.7V and about 0.85V are applied to a plurality of electrodes of a second display device including an integrated touch panel, sensed signals of changes in capacitance have noise levels of about 60 F and about 30 F, respectively.

Here, a touch sensitivity is proportional to a signal to noise ratio (SNR), which is an average value of a sensed signal with a touch input and an average value of a sensed signal without a touch input divided by a maximum value of a noise without a touch input. Accordingly, as the noise increases, the signal to noise ratio decreases and the touch sensitivity is reduced.

The display device including an integrated touch panel has a deviation in noise level and the noise level of the display device including an integrated touch panel varies according to a driving circumstance. For example, the specific touch driving voltage may be an optimum value which minimizes the noise level in a display device including an integrated touch panel and may be a value which maximizes the noise level in another display device including an integrated touch panel. Thus, the noise level may vary across different display devices even when using the same touch driving voltage.

SUMMARY

Embodiments of the present invention relate to a display device including an integrated touch panel and a method of driving the same. Accordingly, embodiments of the present invention are directed to a display device that substantially obviates one or more of the problems due to limitations and disadvantages of the related art.

An object of embodiments is to provide a display device including an integrated touch panel where a touch driving voltage VDDT suitable for a touch driving circumstance is applied to the touch panel.

Advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose according to one aspect of the invention, there is provided a method of driving a display device including an integrated touch panel, the method comprising: applying a plurality of sampling voltages to a plurality of electrodes of the integrated touch panel; determining a plurality of noise levels each of which is associated with a corresponding one of the plurality of sampling voltages; comparing the plurality of noise levels to a threshold level; and selecting a sampling voltage from the plurality of sampling voltages to use as a touch driving voltage based on the comparison of the plurality of noise levels to the threshold level; and applying the selected sampling voltage as the touch driving voltage to the plurality of electrodes.

In another aspect, there is provided a method of driving a display device including an integrated touch panel, the method comprising: applying a plurality of sampling voltages to a plurality of electrodes of the integrated touch panel; determining a plurality of noise levels associated with the plurality of sampling voltages; determining a plurality of noise levels each of which is associated with a corresponding one of the plurality of sampling voltages; comparing the plurality of noise levels to a threshold level; responsive to determining that all the plurality of noise levels are greater than the threshold level: determining a sampling voltage associated with a minimum noise level from amongst the plurality of noise levels; and selecting the determined sampling voltage associated with the minimum noise level as the touch driving voltage; responsive to determining a sampling voltage of the plurality of sampling voltages that is associated with a determined noise level that is less than the threshold level: selecting the determining sampling voltage as the touch driving voltage; and applying the selected sampling voltage as the touch driving voltage to the plurality of electrodes.

In another aspect, there is provided a display device comprising: an integrated touch panel having a plurality of electrodes; and a touch integrated circuit (IC), comprising: a switching unit for applying a plurality of sampling voltages to the plurality of electrodes of the integrated touch panel; a comparing unit for: determining a plurality of noise levels each of which is associated with a corresponding one of the plurality of sampling voltages; comparing the plurality of noise levels to a threshold level; and selecting a sampling voltage from the plurality of sampling voltages to use as a touch driving voltage based on the comparison of the plurality of noise levels to the threshold level; and a touch sensing unit for applying the touch driving voltage to the plurality of electrodes.

It is understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate implementations of the invention and together with the description serve to explain the principles of the invention.

FIGS. 2A and 2B are graphs showing a noise level according to application of a touch driving voltage in a display device including an integrated touch panel according to the related art.

FIG. 3 is a view showing a display device including an integrated touch panel according to one embodiment.

DETAILED DESCRIPTION

Figure 1:
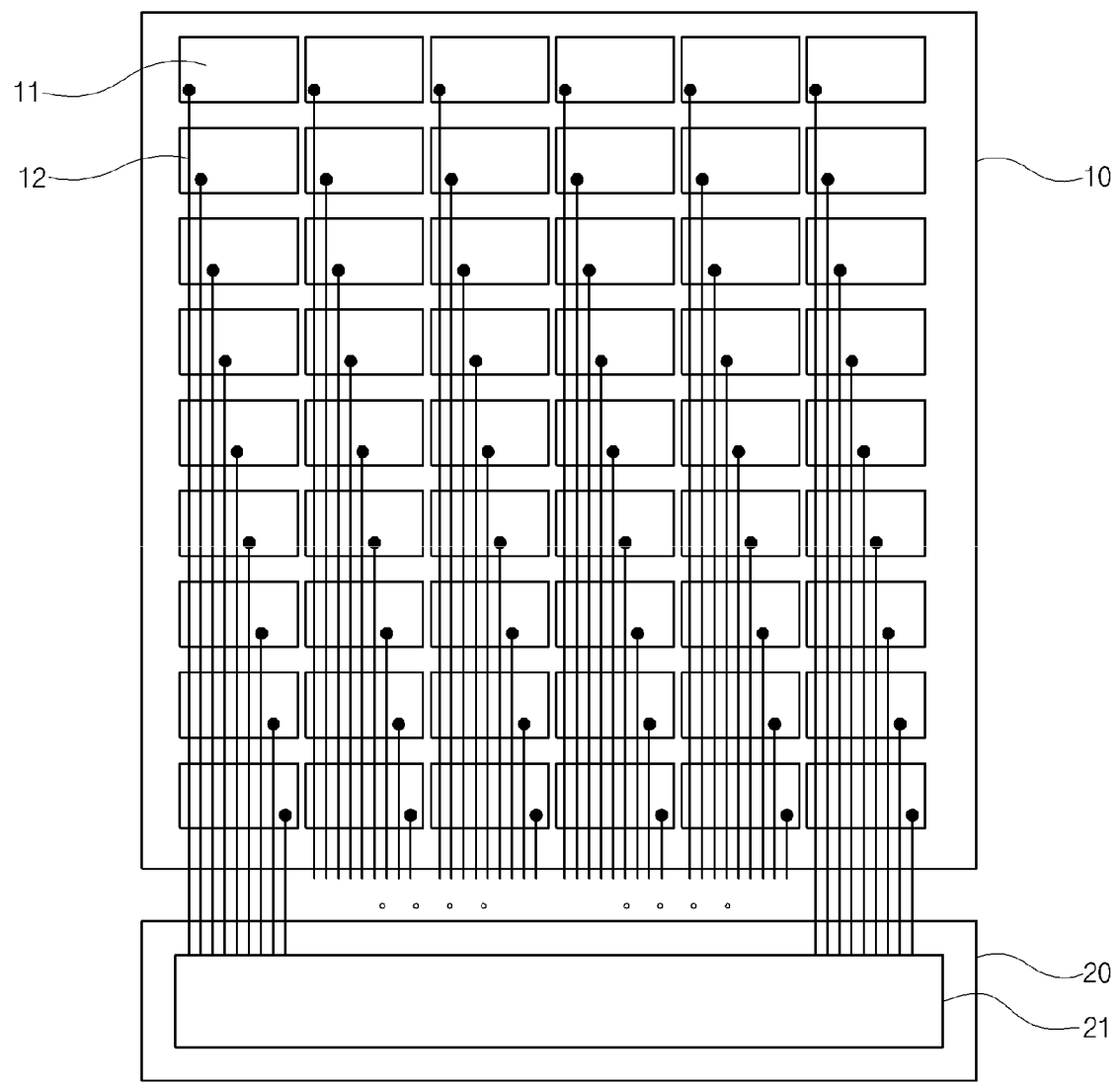
FIG. 1 is a view showing a display device including an integrated touch panel according to the related art.
Figure 2A:
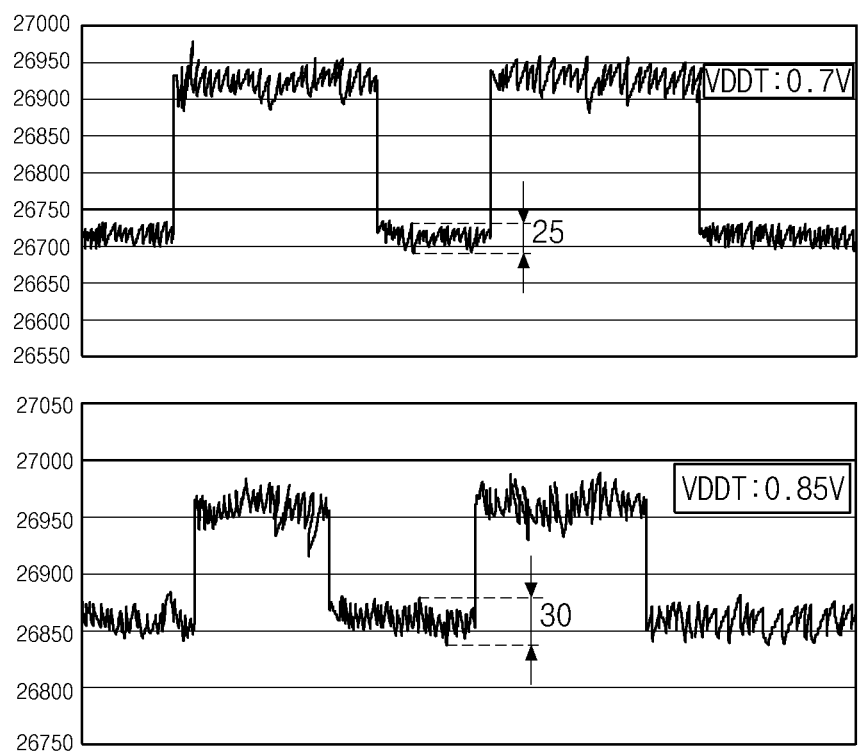

Reference will now be made in detail to embodiments of the present invention, examples of which are illustrated in the accompanying drawings. In the following description, when a detailed description of well-known functions or configurations related to this document is determined to unnecessarily cloud a gist of the invention, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a certain order. Like reference numerals designate like elements throughout. Names of the respective elements used in the following explanations are selected only for convenience of writing the specification and may be thus different from those used in actual products.

FIG. 3 is a view showing a display device including an integrated touch panel according to one embodiment. In FIG. 3, a display device including an integrated touch panel may include a panel 100 and a touch integrated circuit (IC) 200. The panel 100 may have a touch panel (not shown) installed therein, and the touch panel may function to detect a touch position by a user. As an example, the touch panel may have an in-cell self-capacitive type.

The panel 100 may have a structure where a liquid crystal layer is formed between two substrates. For example, a plurality of gate lines, a plurality of data lines crossing the plurality of gate lines, and a plurality of thin film transistors (TFTs) connected to the plurality of gate lines and the plurality of data lines may be formed on a lower substrate of the panel 100. A plurality of pixels may be arranged in a matrix form by the crossing of the plurality of gate lines and the plurality of data lines.

In addition, the panel 100 may include a plurality of electrodes 110 and a plurality of lines 120. The plurality of electrodes 110 function as a common electrode which drives a liquid crystal layer with a pixel electrode in each pixel when a common voltage is applied to the plurality of electrodes 110 for displaying an image and function as a touch electrode which senses a touch position when a touch scan signal is applied to the plurality of electrodes 110 for sensing a touch.

The plurality of lines 120 connect the plurality of electrodes 110 and the touch IC 200. For example, the plurality of lines 120 may transmit the touch scan signal from the touch IC 200 to the plurality of electrodes 110 and may transmit the change in capacitance from the plurality of electrodes 110 of the panel 100 to the touch IC 200.

In addition, the touch IC 200 applies a touch driving voltage VDDT which minimizes a noise level to the plurality of electrodes 110 and senses the touch position using the changes in capacitance according to the touch driving voltage VDDT. For example, the touch IC 200 may include a variable sampling voltage generating unit 210 which generates a variable sampling voltage and a comparing unit 220 which repeatedly calculates (i.e., determines) a noise level according to the variable sampling voltage using a signal received from the plurality of electrodes 110 due to application of the variable sampling voltage to the plurality of electrodes 110 and to compare the noise level with a predetermined level.

In addition, the touch IC 200 may further include a touch sensing unit 230 which generates the touch driving voltage VDDT and senses the touch position according to a touch input using the signal received from the plurality of electrodes 110 according to the touch driving voltage VDDT and a switching unit 240 which applies the variable sampling voltage of the variable sampling voltage generating unit 210 or the touch driving voltage VDDT of the touch sensing unit 230 to the plurality of electrodes 110.

The variable sampling voltage generating unit 210 generates a plurality of sampling voltages for calculating (i.e., determining) noise levels of the plurality of electrodes 110 according to different voltages and sequentially applies the plurality of sampling voltages to the plurality of electrodes 110. In one embodiment, the variable sampling voltage generating unit 210 generates each of the plurality of sampling voltages by randomly selecting a sampling voltage from a range of voltages. For example, the variable sampling voltages may be selected from within a range of about 0.01 $VDDT_{threshold}$ to about 1 $VDDT_{threshold}$. In one embodiment, $VDDT_{threshold}$ is a threshold voltage required to sense a touch of the panel 100.

The comparing unit 220 repeatedly calculates the noise levels according to the sampling voltages using the signal received from the plurality of electrodes 110 due to application of the sampling voltages and to compare the noise levels with the predetermined level and stores the noise levels.

For example, when all of the calculated noise levels are higher than the predetermined level for a predetermined time period, the comparing unit 220 may store the noise levels calculated for the predetermined time period and may determine (i.e., select) the sampling voltage corresponding to the noise level having a minimum value among the stored noise levels as the touch driving voltage VDDT. In one embodiment, the predetermined time period may be a period of time corresponding to two frames (e.g., a period of a clock cycle of the panel) of the panel 100 from when the panel 100 is turned on or may be a period of time from when the panel 100 is turned on to receiving a touch input by a user. The comparing unit 220 may transmit the information regarding the touch driving voltage VDDT to the touch sensing unit 230.

In addition, when one of calculated (i.e., determined) noise levels is lower than the predetermined level for the predetermined time period, the comparing unit 220 may store the noise level lower than the predetermined level and may determine (i.e., select) the sampling voltage corresponding to the stored noise level as the touch driving voltage VDDT. The comparing unit 220 may transmit the information regarding the touch driving voltage VDDT to the touch sensing unit 230.

For example, the predetermined level may be a value within a range of ¼ of a touch threshold level $VDDT_{threshold}$ to ¾ of the touch threshold level $VDDT_{threshold}$. Specifically, the predetermined level may be ½ of the touch threshold level $VDDT_{threshold}$. In one embodiment, the touch threshold level $VDDT_{threshold}$ is a voltage level signifying whether the panel 100 is touched.

The touch sensing unit 230 generates the touch driving voltage VDDT according to the information from the comparing unit 220 and applies the touch driving voltage VDDT to the plurality of electrodes 110 through the switching unit 240. In one embodiment, the touch sensing unit 230 generates the touch driving voltage VDDT each time the display device is in the touch driving mode. The touch sensing unit 230 may generate the touch driving voltage at least once during the touch driving mode of the display device. The touch sending unit 230 receives the changes in capacitance according to the touch driving voltage VDDT and the touch input by the user through the switching unit 240 and the comparing unit 220 and senses the touch position by the user using the changes in capacitance.

The switching unit 240 sequentially applies the sampling voltages of the variable sampling voltage generating unit 210 to the plurality of electrodes 110 and transmits the noise levels of the plurality of electrodes 110 according to the applied sampling voltages to the comparing unit 220. The switching unit 240 applies the touch driving voltage VDDT of the touch sensing unit 230 to the plurality of electrodes 110 and transmits the changes in capacitance of the plurality of electrodes 110 according to the touch driving voltage VDDT to the touch sensing unit 230 through the comparing unit 220.

Further, the switching unit 240 determines (i.e., selects) the sampling voltage corresponding to the noise level having the minimum value among the calculated (i.e., determined) noise levels as the touch driving voltage VDDT and applies the determined sampling voltage to the plurality of electrodes 110 while the panel 100 driven by a time sharing driving method during a touch driving mode. In one embodiment, during the time sharing driving method, the panel 100 is operated in both the display driving mode and the touch driving mode within a frame (e.g., a period) of the panel 100. Alternatively, the switching unit 240 determines (i.e., selects) the sampling voltage corresponding to the noise level lower than the predetermined level as the touch driving voltage VDDT and applies the determined sampling voltage to the plurality of electrodes 110 while the panel 100 driven by a time sharing method during a touch driving mode.

Although the variable sampling voltage generating unit 210, the comparing unit 220 and the switching unit 230 are formed inside the touch IC 200 of the display device including an integrated touch panel according to an embodiment of the present invention, the variable sampling voltage generating unit 210, the comparing unit 220 and the switching unit 230 may be formed outside the touch IC 200 in another embodiment. In addition, the display device including an integrated touch panel may include a display driving IC for display driving as well as the touch IC for touch driving.

In the display device including an integrated touch panel according to an embodiment of the present invention, the noise levels according to the different touch driving voltages are detected from the plurality of electrodes during the touch sensing time period and the voltage corresponding to the minimum noise level is selected as the touch driving voltage. As a result, the signal to noise ratio (SNR) of touch sensing is improved and the higher touch sensitivity is obtained.

Figure 4:
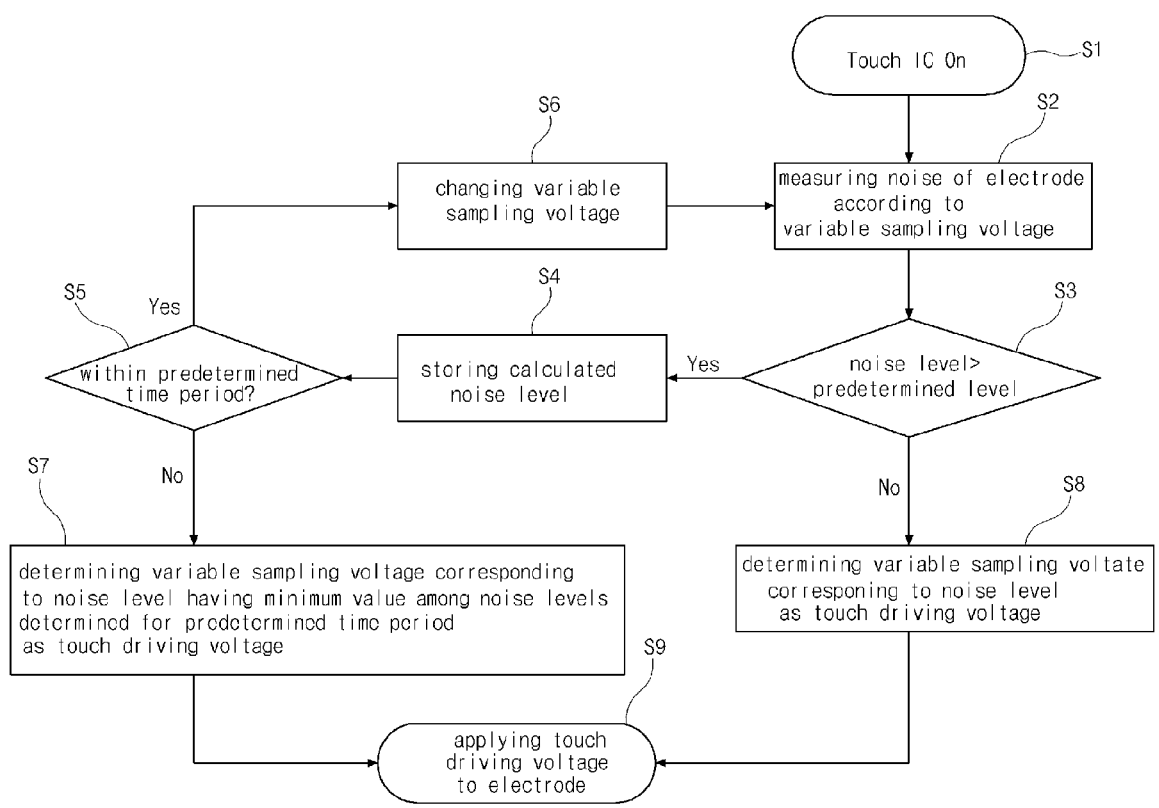
FIG. 4 is a view showing an operation of a display device including an integrated touch panel according to one embodiment.

A method of driving the display device including an integrated touch panel according to an embodiment will be described with reference to FIG. 4. FIG. 4 is a view showing an operation of a display device including an integrated touch panel according to an embodiment of the present invention.

In FIG. 4, a method of driving a display device including an integrated touch panel according to an embodiment of the present invention may include a step of repeatedly applying the variable sampling voltages to the plurality of electrodes of the panel, determination of the noise level according to the variable sampling voltage using the signal received from the plurality of electrodes and comparison of the noise level with the predetermined level and a step of selecting the sampling voltage corresponding to the noise level having the minimum value among the determined noise levels as the touch driving voltage VDDT and applying the touch driving voltage VDDT to the plurality of electrodes when all of the determined noise levels are higher than the predetermined level for the predetermined time period.

In addition, the method of driving a display device including an integrated touch panel according to an embodiment of the present invention may further include a step of selecting the sampling voltage corresponding to the noise level lower than the predetermined level as the touch driving voltage VDDT and applying the touch driving voltage VDDT to the plurality of electrodes when one of the determined noise levels is lower than the predetermined level for the predetermined time period.

When the panel starts to operate, a step S1 of driving the touch IC 200 in an On state is performed. For example, the touch IC 200 may have an Off state when the panel is not driven, and the touch IC 200 may have an On state when the display device is driven.

Next, for the purpose of measuring the noise of the plurality of electrodes according to the different driving voltages, a step S2 of applying the variable sampling voltage to the plurality of electrodes of the panel and measuring the noise of the plurality of electrodes according to the variable sampling voltage is performed. For example, the variable sampling voltage may be within a range of about 0.01 $VDDT_{threshold}$ to about 1 $VDDT_{threshold}$, where $VDDT_{threshold}$ is a is a threshold voltage level signifying whether the panel 100 is touched.

Next, a step S3 of determining the noise level according to the variable sampling voltage using the noise received from the plurality of electrodes and comparing the noise level with the predetermined level is performed. For example, the predetermined level may be a value within a range of approximately ¼ of a touch threshold level $VDDT_{threshold}$ to approximately ¾ of the touch threshold level $VDDT_{threshold}$. Specifically, the predetermined level may be approximately ½ of the touch threshold level $VDDT_{threshold}$.

Next, a step S4 of storing the determined noise level when the noise level is higher than the predetermined level is performed, and a step S8 of determining the sampling voltage corresponding to the determined noise level as the touch driving voltage when the determined noise level is lower than the predetermined level.

The touch input in the touch panel by the user is sensed through a step S9 of applying the touch driving voltage VDDT to the plurality of electrodes. The touch driving voltage may be applied to the plurality of electrodes while the panel driven by a time sharing method during a touch driving mode.

Next, after the step S4 of storing the determined noise level when the noise level is higher than the predetermined level is performed, a step S5 of verifying whether the step of measuring the noise according to the variable sampling voltage is performed within the predetermined time period. For example, the predetermined time period may be a period of time from when the panel 100 is turned on to two frames of the panel 100 or may be a period of time from when the panel is turned on to receiving a touch input by a user.

When the step of measuring the noise according to the variable sampling voltage is performed within the predetermined time period, a step S6 of changing the variable sampling voltage is performed. For example, the variable sampling voltage may be changed within a range of about 0.01 $VDDT_{threshold}$ to about 1 $VDDT_{threshold}$, where $VDDT_{threshold}$ is a threshold voltage level signifying whether the panel 100 is touched.

Next, the step S2 of measuring the noise of the plurality of electrodes according to the changed variable sampling voltage is performed again and the steps S2 to S6 are repeatedly performed when the step of measuring the noise according to the changed variable sampling voltage is performed within the predetermined time period.

After the steps S2 to S6 are repeatedly performed, a step S7 of determining (i.e., selecting) the sampling voltage corresponding to the noise level having the minimum value among the determined noise levels as the touch driving voltage VDDT is performed when the step of measuring the noise according to the changed variable sampling voltage is performed beyond the predetermined time period.

The touch input in the touch panel by the user is sensed through the step S9 of applying the touch driving voltage VDDT to the plurality of electrodes. The touch driving voltage may be applied to the plurality of electrodes while the panel driven by a time sharing method during a touch driving mode.

In a display device including an integrated touch panel and a method of driving the same according to an embodiment of the present invention, consequently, the noise levels according to the different touch driving voltages are determined by applying the variable sampling voltages to the plurality of electrodes during the touch sensing time period and the voltage having the minimum noise level is determined as the touch driving voltage. In addition, the signal to noise ratio (SNR) is improved and the higher touch sensitivity is obtained.

It will be apparent to those skilled in the art that various modifications and variations can be made in embodiments of the present invention without departing from the spirit or scope of the invention. Thus, it is intended that the present invention cover the modifications and variations of this invention provided they come within the scope of the appended claims and their equivalents.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of driving a display device including an integrated in-cell self-capacitive touch panel, the method comprising:
    applying a plurality of sampling voltages to a plurality of common electrodes of the integrated in-cell self-capacitive touch panel via a plurality of lines connected to the plurality of common electrodes, each of the plurality of sampling voltages applied to the plurality of common electrodes via the plurality of lines that are each connected to a corresponding one of the plurality of common electrodes;
    receiving noise signals from the plurality of common electrodes via the plurality of lines to which the sampling voltages are applied, each noise signal received from a corresponding one of the plurality of common electrodes via one of the plurality of lines that is connected to the corresponding one of the plurality of common electrodes;
    determining a plurality of noise levels based on the received noise signals, each of the plurality of noise levels associated with a corresponding one of the plurality of sampling voltages;
    comparing the plurality of noise levels to a threshold level;
    selecting a sampling voltage from the plurality of sampling voltages to use as a touch driving voltage based on the comparison of the plurality of noise levels to the threshold level;
    applying a common voltage to all the common electrodes of the display device via the plurality of lines while the display device is driven in a time sharing method during a display period of a display frame of the integrated in-cell self-capacitive touch panel; and
    applying the selected sampling voltage as the touch driving voltage to the plurality of the common electrodes via the plurality of lines while the display device is driven in the time sharing method during a touch driving period of the display frame, wherein the touch driving period does not overlap with the display period of the display frame and wherein during the display period of the display frame the selected sampling voltage is not applied to any of the common electrodes of the display device;
    wherein the plurality of common electrodes of the integrated in-cell self-capacitive touch panel are used for both displaying an image during the display period of the display frame and sensing touch of the integrated in-cell self-capacitive touch panel during the touch driving period of the display frame.

2. The method of claim 1, wherein the plurality of sampling voltages are selected from a range of 0.01 VDDTthreshold to 1 VDDTthreshold, wherein VDDTthreshold is the threshold level to sense a touch of the display device.

3. The method of claim 1, wherein the plurality of noise levels are determined during a period of time from when the integrated in-cell self-capacitive touch panel is turned on.

4. The method of claim 3, wherein the period of time corresponds to two frames of the integrated in-cell self-capacitive touch panel from when the integrated in-cell self-capacitive touch panel is turned on.

5. The method of claim 1, wherein the plurality of noise levels are determined within a period of time from when the integrated in-cell self-capacitive touch panel is turned on to when a touch input is received.

6. The method of claim 1, wherein selecting the sampling voltage comprises:
   determining that all the plurality of noise levels are greater than the threshold level;
   determining a sampling voltage associated with a minimum noise level from amongst the plurality of noise levels; and
selecting the determined sampling voltage associated with the minimum noise level as the touch driving voltage.

7. The method of claim 1, wherein selecting the sampling voltage comprises:
   determining one of the sampling voltages associated with a determined noise level that is less than the threshold level; and
   selecting the determined sampling voltage as the touch driving voltage.

8. The method of claim 1, wherein the threshold level is within a range of ¼ of a touch threshold level to ¾ of the touch threshold level, the touch threshold level signifying whether a touch input is received at the integrated in-cell self-capacitive touch panel.

9. The method of claim 1, wherein the threshold level is ½ of a touch threshold level, the touch threshold level signifying whether a touch input is received at the integrated in-cell self-capacitive touch panel.

10. A method of driving a display device including an integrated in-cell self-capacitive touch panel, the method comprising:
   applying a plurality of sampling voltages to a plurality of common electrodes of the integrated in-cell self-capacitive touch panel via a plurality of lines connected to the plurality of common electrodes, each of the plurality of sampling voltages applied to the plurality of common electrodes via the plurality of lines that are each connected to a corresponding one of the plurality of common electrodes;
   receiving noise signals from the plurality of common electrodes via the plurality of lines to which the sampling voltages are applied, each noise signal received from a corresponding one of the plurality of common electrodes via one of the plurality of lines that is connected to the corresponding one of the plurality of common electrodes;
determining a plurality of noise levels based on the received noise signals, each of the plurality of noise levels associated with a corresponding one of the plurality of sampling voltages;
   comparing the plurality of noise levels to a threshold level;
   responsive to determining that all the plurality of noise levels are greater than the threshold level:
   determining a sampling voltage associated with a minimum noise level from amongst the plurality of noise levels; and
   selecting the determined sampling voltage associated with the minimum noise level as the touch driving voltage;
   responsive to determining one of the sampling voltages that is associated with a determined noise level that is less than the threshold level:
   selecting the determined sampling voltage as the touch driving voltage;
applying a common voltage to all of the common electrodes of the display device via the plurality of lines while the display device is driven in a time sharing method during a display period of a display frame of the integrated in-cell self-capacitive touch panel; and applying the selected sampling voltage as the touch driving voltage to the plurality of common electrodes via the plurality of lines while the display device is driven in the time sharing method during a touch driving period of the display frame, wherein the touch driving period does not overlap with the display period of the display frame and wherein during the display period of the display frame the selected sampling voltage is not applied to any of the electrodes of the display device;
   wherein the plurality of common electrodes of the integrated in-cell self-capacitive touch panel are used for both displaying an image during the display period of the display frame and sensing touch of the integrated in-cell self-capacitive touch panel during the touch driving period of the display frame.

11. A display device comprising:
   an integrated in-cell self-capacitive touch panel having a plurality of electrodes, a common voltage applied to all common electrodes of the display device while the display device is driven in a time sharing method during a display period of a display frame; and
   a touch integrated circuit (IC), comprising:
a switching unit for applying a plurality of sampling voltages to the plurality of common electrodes of the integrated in-cell self-capacitive touch panel via a plurality of lines connected to the plurality of common electrodes, each of the plurality of sampling voltages applied to the plurality of common electrodes via the plurality of lines that are each connected to a corresponding one of the plurality of common electrodes;
a comparing unit for:
receiving noise signals from the plurality of common electrodes via the plurality of lines to which the sampling voltages are applied, each noise signal received from a corresponding one of the plurality of common electrodes via one of the plurality of lines that is connected to the corresponding one of the plurality of common electrodes;
determining a plurality of noise levels based on the received noise signals, each of the plurality of noise levels associated with a corresponding one of the plurality of sampling voltages;
   comparing the plurality of noise levels to a threshold level; and
selecting a sampling voltage from the plurality of sampling voltages to use as a touch driving voltage based on the comparison of the plurality of noise levels to the threshold level;
   and a touch sensing unit for applying the touch driving voltage to the plurality of common electrodes via the plurality of lines while the display device is driven in the time sharing method during a touch driving period of the display frame of the integrated in-cell self-capacitive touch panel, wherein the touch driving period does not overlap with the display period of the display frame and wherein during the display period of the display frame the touch driving voltage is not applied to any of the common electrodes of the display device;
   wherein the plurality of common electrodes of the integrated in-cell self-capacitive touch panel are used for both displaying an image during the display period of the display frame and sensing touch of the integrated in-cell self-capacitive touch panel during the touch driving period of the display frame.

12. The display device of claim 11, wherein the plurality of sampling voltages are selected from a range of 0.01 VDDTthreshold to 1 VDDTthreshold, wherein VDDTthreshold is the threshold level to sense a touch of the display device.

13. The display device of claim 11, wherein the comparing unit determines the plurality of noise levels during a period of time from when the integrated in-cell self-capacitive touch panel is turned on.

14. The display device of claim 13, wherein the period of time corresponds to two frames of the integrated in-cell self-capacitive touch panel from when the integrated in-cell self-capacitive touch panel is turned on.

15. The display device of claim 11, wherein the comparing unit determines the plurality of noise levels within a period of time from when the integrated in-cell self-capacitive touch panel is turned on to receiving a touch input.

16. The display device of claim 11, wherein the comparing unit selects the sampling voltage by:
   determining that all the plurality of noise levels are greater than the threshold level;
   determining a sampling voltage associated with a minimum noise level from amongst the plurality of noise levels; and
   selecting the determined sampling voltage associated with the minimum noise level as the touch driving voltage.

17. The display device of claim 11, wherein the comparing unit selects the sampling voltage by:
   determining one of the sampling voltages associated with a noise level that is less than the threshold level; and
   selecting the determined sampling voltage as the touch driving voltage.

18. The display device of claim 11, wherein the threshold level is within a range of ¼ of a touch threshold level to ¾ of the touch threshold level or the threshold level is ½ of the touch threshold level, the touch threshold level signifying whether a user has touched the integrated in-cell self-capacitive touch panel.

* * * * *